Jan. 12, 1937. V. E. CARBONARA 2,067,474
INCLINOMETER
Original Filed July 8, 1933
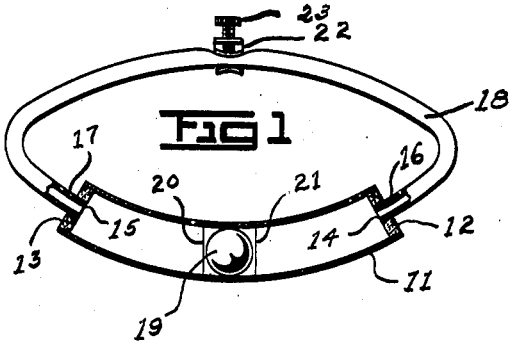
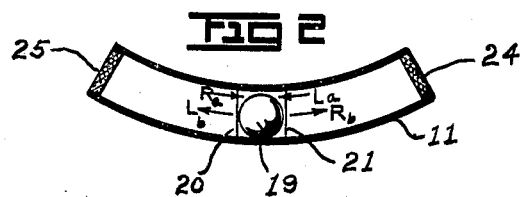
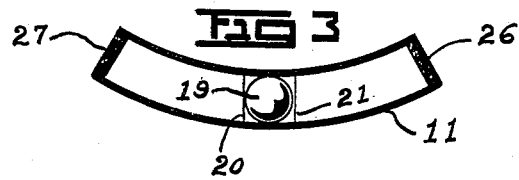
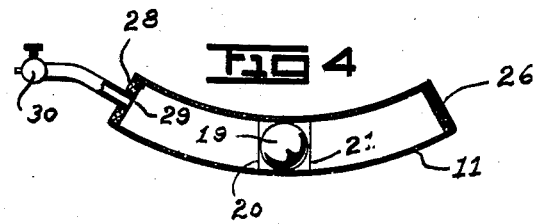
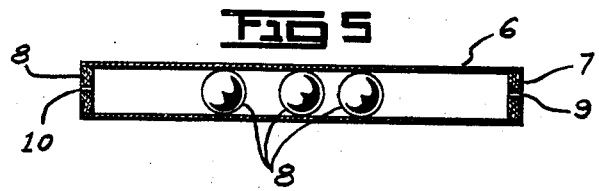
INVENTOR.
Victor E. Carbonara.
BY
Stephen Cerstvik
ATTORNEY Patented Jan. 12, 1937

2,067,474

UNITED STATES PATENT OFFICE 2,067,474

INCLINOMETER

Victor E. Carbonara, Rockville Centre, N. Y., assignor to Bendix Aviation Corporation, South Bend, Ind., a corporation of Delaware Application July 8, 1933, Serial No. 679,571
Renewed June 26, 1936

22 Claims. (Cl. 33—206)

The present invention relates to inclinometers and more particularly to inclinometers of the gravity actuated ball type adapted for use on aircraft to indicate lateral inclination or bank.

Inclinometers of the above general type, as made at the present time, consist of an arcuately curved and transparent glass tube containing a steel ball immersed in a suitable damping liquid, the tube being sealed at both ends. The glass tube is adapted for mounting on the instrument board of an aircraft and in a vertical plane transversely of the aircraft with the ball in the center of the tube whereby upon an inclination of the craft about its fore and aft axis the ball is caused to roll by gravity toward one or the other end of the tube, the liquid acting to slow up or dampen the action of the ball. A relatively large clearance is provided between the ball and the interior of the tube to permit the liquid to flow freely around the ball when the latter is rolling in the tube.

Such devices, however, deteriorate rapidly due to chemical action on the steel ball by the liquid causing the latter and the ball to become so discolored that the ball cannot be observed. Also the viscosity of the liquid changes materially with changes in temperature so that at low temperature, encountered at high altitudes, the action of the ball becomes too sluggish and at high temperatures such as are encountered in the tropics, the ball moves too freely and quickly. Furthermore, creeping of the ball in the tube occurs due to vibration of the aircraft because of the relatively large clearance required between the ball and tube when liquid is used as a damper, i. e., the ball tends to creep up towards one or the other end of the tube thereby giving a false indication of inclination when none occurs.

Accordingly, one of the objects of the present invention is to provide a novel inclinometer of the class described whereby the use of a damping liquid is not necessary and, hence, deterioration and discoloration of the inclinometer is prevented.

Another object is to provide an inclinometer of the gravity actuated ball type using air or inert gas to dampen the action of the ball.

Another object is to provide an inclinometer of the above type embodying novel means whereby the damping action on the ball of the inclinometer may be adjusted to any desired extent.

Still another object is to provide a ball type inclinometer which is relatively simple in construction but the efficiency of which is substantially increased and which may be manufactured economically on a production basis.

The above and other objects and advantages of the invention will appear more fully hereinafter from a consideration of the detailed description which follows, taken in connection with the attached drawing wherein four embodiments of the invention are illustrated. It is to be expressly understood, however, that the drawing is for the purpose of illustration and description only and is not designed as a definition of the limits of the invention, reference being had to the appended claims for this purpose.

In the drawing wherein like reference characters refer to like parts throughout the several views, Fig. 1 is an elevation, partly in section, of one form of inclinometer embodying the present invention and showing one method of adjusting the damping action on the ball thereof;

Fig. 2 is a longitudinal section of another form of inclinometer embodying the invention;

Fig. 3 is a similar view of a further embodiment;

Fig. 4 illustrates still another embodiment; and

Fig. 5 is a longitudinal section of a device illustrating the principle of operation of the invention.

Referring first to Fig. 5 for an understanding of the principle of operation of the device embodying the present invention, there is shown a straight transparent glass tube 6 closed at both ends with suitable plugs 7 and 8 provided with capillary apertures or orifices 9 and 10, respectively, for permitting the air entrapped within the tube to gradually leak out in a manner to be described. Within the glass tube are placed three balls 8, preferably of steel, in order to have sufficient weight to be actuated by gravity. By a recently developed process which, however, forms no part of the present invention, it has been found that the bore of the glass tube may be made so uniform through its entire length that when the balls placed in the tube have substantially the same diameter as the bore of the tube said balls form a piston fit with the tube of such a nature that no air can pass around the balls. The truth of this has been demonstrated by closing the capillary openings 9 and 10 of the tube while the balls are in the center or at one end of the tube and setting the tube in an upright position. When this is done, the balls move toward the bottom of the tube until the air between them is compressed by the piston action to such an extent that the balls are then maintained stationary by the air cushions between them and the lower end of the tube when the latter is in a vertical position. When the fingers are removed from the capillary openings the balls gradually move to the bottom of the tube at the rate at which air is forced out of the bottom opening and sucked in at the top opening due to a vacuum created at the upper end when the tube is first set in a vertical position with the capillary openings closed. Therefore, this piston action of the balls within the tube renders it highly desirable for use in an inclinometer of the gravity actuated ball type employing the piston action for damping the movement of the ball of the inclinometer. It has also been found that the straight tube may be bent without destroying the uniformity of the internal bore so that the piston fit of the balls therein is maintained, or the tube may be molded or otherwise suitably made in a curved form.

Applying the above principle, in accordance with the present invention, there is illustrated in Fig. 1 one form of inclinometer comprising an arcuately curved transparent tube 11 of some suitable transparent material such as glass, and is closed at both ends by means of suitable plugs 12 and 13 provided with restricted openings 14 and 15, respectively, and into which are placed, by an air-tight fit, the ends 16 and 17, respectively, of a tube 18 of some suitable flexible material such as rubber tubing. The bore of the glass tube 11 is made uniform throughout its length, and placed therewithin is a ball 19 having substantially the same diameter as the bore of the tube thereby forming a piston fit within the tube of such a nature that no air can pass around the ball between the latter and the wall of the tube. The ball is centered within the tube by leveling the tube until gravity maintains it in the actual center and a pair of reference marks 20 and 21 are then inscribed or etched on the front side of the glass tube through which the ball is visible. When the tube is mounted on an instrument panel of an aircraft in the position shown in the drawing then upon an inclination of the craft to the left about its fore and aft axis, tube 11 will be inclined therewith, thereby causing the ball 19 to roll toward the left end of the tube as viewed in Fig. 1. As the ball begins to roll the piston action thereof will cause air to be forced out of the left end of the glass tube through the opening 15 and through the tube 18 and will be forced into the right end of the glass tube 11 through the opening 14. The rate of movement of the ball will depend upon the size of the openings 14 and 15, i. e., the rate of movement will depend upon the rate at which the air is forced out of one opening and into the tube through the other opening. Thus the piston action of the ball 19 within the glass tube 11 provides a damping action on the ball so that it will not move too freely within the tube.

It may be desirable to vary the damping action or rate of movement of the ball 19 and for this purpose means are provided for restricting the passage of air or other gas through the tube 18. In the form shown, said means comprise a pinchcock 22 provided with an adjusting screw 23 by which the constriction of the tube 18 may be varied until the desired damping action on the ball 19 is obtained.

In the event that a steel ball is used the tube 11 may be filled with an inert gas such as nitrogen, helium or argon in order to prevent corrosion of the ball but, preferably, a solid glass ball may be used which is made of the same glass as the tube in order that both may have the same coefficient of expansion.

In Fig. 2 is shown another embodiment of the invention in which the ends of the curved transparent glass tube 11 are completely sealed by means of suitable plugs 24 and 25 but in which the ball 19 does not have a piston fit within the tube in order to provide sufficient clearance to permit restricted passage of air or inert gas around it as it moves within the tube. The clearance, of course, must be very small in order to get the desired damping action. If the ball moves to the right, for example, as indicated by the arrow $R_b$ air will be forced from the right end of the tube around the ball and to the left as indicated by the arrow $L_a$. The reverse action takes place upon movement of the ball to the left as indicated by corresponding arrows $L_b$ and $R_a$.

In Fig. 3 is shown still another embodiment in which both ends of the curved transparent tube 11 are closed by means of caps 26 and 27, respectively of some suitable porous material having a porosity such that air can pass therethrough only very slowly as, for example, closely matted steel or glass wool, thereby providing a substantially capillary passage. The ball 19 has a piston fit with the inner wall of the tube, as in Fig. 1, and as it moves to the left or right it pushes the air out of one end and sucks air in at the other end. By using different porous materials for the caps 26 and 27, different degrees of damping action on the ball 19 may be obtained.

Fig. 4 illustrates a still further embodiment similar to that shown in Fig. 3 and in which the curved transparent tube 11 is closed at one end by means of a cap 26 of porous material but is closed at its other end by means of a solid plug 28 having an opening 29 to which is attached an adjustable capillary leak valve 30 for adjusting the damping action by varying the rate at which the air is sucked in one end and forced out through the other end by the piston action of the ball.

In the embodiments described above in which the tube is open to the atmosphere through capillary openings the ball may be of agate, frosted or colored glass of the same material as the tube, stainless steel, precious metals, nickel or stellite, and in the embodiment shown in Figs. 1 and 2 in which the ball is not exposed to the atmosphere the ball may be made of any suitable material having a coefficient of expansion substantially the same as that of the tube in which the ball is adapted to fit in order that the damping action, once determined or adjusted, will remain constant.

There is thus provided a novel inclinometer of the gravity actuated ball type which does not employ a liquid, which is highly efficient, easily and economically manufactured and in which the damping action may be adjusted to any desired degree.

Although several embodiments have been illustrated and described, it will now be apparent to those skilled in the art that various changes and modifications in the form and relative arrangement of the parts may be made without departing from the scope of the invention. Reference is, therefore, to be had to the appended claims for a defination of the limits of the invention.

What is claimed is:

1. An inclinometer comprising a curved transparent tube containing a gas, and a ball in said tube adapted to roll therein by the action of gravity upon inclination of the tube, the latter having a uniform internal bore such that said ball forms a piston fit therein whereby the gas is substantially prevented from passing around the ball, and also having restricted openings at its ends whereby a damping action is produced on the ball by its piston action in forcing the gas out of the tube through the restricted openings.

2. An inclinometer comprising a curved transparent tube containing a gas, and a ball of the same material as the tube or of some suitable material having the same coefficient of expansion as the material of the tube, said ball being adapted to roll in the tube by the action of gravity upon inclination of said tube, the latter having a uniform internal bore so that said ball forms a piston fit therein whereby the gas is substantially prevented from passing around the ball, and also having restricted openings at its ends whereby a damping action is produced on the ball by its piston action in forcing the gas out of the tube through the restricted openings.

3. An inclinometer comprising a curved transparent glass tube containing a gas, and a ball of the same kind of glass as the tube and adapted to roll therein by the action of gravity upon inclination of the tube, the latter having a uniform internal bore so that said ball forms a piston fit therein whereby the gas is substantially prevented from passing around the ball, and also having restricted openings at its ends whereby a damping action is produced on the ball by its piston action in forcing the gas out of the tube through the restricted openings.

4. An inclinometer comprising a curved transparent tube containing a gas, a ball in said tube adapted to roll therein by the action of gravity upon inclination of the tube, the latter having a uniform internal bore so that said ball forms a piston fit therein whereby the gas is substantially prevented from passing around the ball, and also having restricted openings at its ends whereby a damping action is produced on the ball by its piston action in forcing the gas out of the tube through the restricted openings, and means for varying said damping action.

5. An inclinometer comprising a curved transparent tube having a restricted opening at each end thereof, a flexible tube connecting the ends of the first tube through said restricted openings, a gas in said tubes completely filling them, and a ball in said transparent tube adapted to roll therein upon inclination of the tube, the latter having a uniform internal bore of such dimensions that the ball forms a piston fit therein to force the gas out of one restricted opening and to draw the gas in at the other opening and through the flexible tube as the ball rolls in either direction in said tube whereby a damping action is produced on the ball.

6. An inclinometer comprising a curved transparent tube having a restricted opening at each end thereof, a flexible tube connecting the ends of the first tube through said restricted openings, a gas in said tubes completely filling them, a ball in said transparent tube adapted to roll therein upon inclination of the tube, the latter having a uniform internal bore of such dimensions that the ball forms a piston fit therein to force the gas out of one restricted opening and to draw the gas in at the other opening and through the flexible tube as the ball rolls in either direction in said tube whereby a damping action is produced on the ball, and means for adjustably restricting the passage of the gas through the flexible tube to vary the damping action.

7. An inclinometer comprising a curved transparent tube having its ends plugged up with porous material having a porosity such that air can pass therethrough only very slowly, and a ball in said tube adapted to roll therein by the action of gravity upon inclination of the tube, the latter having a uniform internal bore so that the ball forms a piston fit therein whereby a damping action is produced on the ball by the gas as the latter is forced through the porous material at one end of the tube and sucked in through the porous material at the other end of the tube.

8. An inclinometer comprising a curved transparent tube having one end thereof plugged up with porous material of a porosity such that air can pass therethrough only very slowly, an adjustable capillary valve at the other end of the tube for adjusting the rate at which the air may pass therethrough, and a ball in said curved tube adapted to roll therein by the action of the gravity upon inclination of the tube, the latter having a uniform internal bore of such dimensions that the ball forms a piston fit therein whereby a damping action is produced on the ball by the gas as it passes through the porous material and the adjustable valve.

9. An inclinometer comprising a curved transparent tube having a restricted opening at each end thereof, a tube connecting the ends of the first tube through said restricted openings, a gas in said tube, and a ball in said transparent tube adapted to roll therein upon inclination of the tube, said latter tube having a uniform internal bore of such dimensions that the ball forms a piston fit therein to force the gas out of one restricted opening and to draw the gas in at the other opening and through the connecting tube as the ball rolls in either direction in said tube whereby a damping action is produced on the ball.

10. An inclinometer comprising a curved transparent tube having a restricted opening at each end thereof, a tube connecting the ends of the first tube through said restricted openings, a gas in said tube, and a ball in said transparent tube adapted to roll therein upon inclination of the tube, said latter tube having a uniform internal bore of such dimensions that the ball forms a piston fit therein to force the gas out of one restricted opening and to draw the gas in at the other opening and through the connecting tube as the ball rolls in either direction in said tube whereby a damping action is produced on the ball, and means for adjustably restricting the passage of the gas through the connecting tube to vary the damping action.

11. An inclinometer comprising a curved transparent tube containing a gas, and a ball in said tube adapted to roll therein by the action of gravity upon inclination of the tube, the latter having a uniform internal bore such that said ball forms a piston fit therein whereby the gas is substantially prevented from passing around the ball, and also having a restricted passage at least at one end thereof whereby a damping action is produced on the ball by its piston action in forcing the gas out of the tube through the restricted passage.

12. An inclinometer comprising a curved transparent tube having an opening at each end thereof, a second tube connecting the ends of said first tube through said openings, a gas in said tubes, and a ball in said transparent tube adapted to roll therein by the action of gravity upon inclination of said tube, said latter tube having a uniform internal bore of such dimensions that the ball forms a piston fit therein to force the gas out of one opening and to draw the gas in at the other opening and through the connecting tube as the ball rolls in either direction in said first tube, and means for restricting the passage of the gas through the connecting tube whereby a damping action is produced on the ball by its piston action in forcing the gas out at one end and in at the other end of said first tube.

13. An inclinometer comprising an elongated curved glass-walled substantially closed vessel containing a gas, and a rolling member in said vessel adapted to roll therein by the action of gravity upon inclination of the vessel lengthwise, said vessel having an internal surface such that said rolling member forms a piston fit therein whereby the gas is substantially prevented from passing around said rolling member, and also having a restricted passage at least at one end thereof whereby a damping action is produced on said rolling member by its piston action in forcing the gas out of said vessel through said restricted passage.

14. An inclinometer comprising an elongated curved glass-walled substantially closed vessel containing a gas, means connecting the ends of said closed vessel to provide for the passage of said gas from one end of said vessel to the other, a rolling member in said vessel adapted to roll therein by the action of gravity upon inclination of said vessel, lengthwise, said vessel having an internal surface such that said rolling member forms a piston fit therein whereby the gas is substantially prevented from passing around said rolling member, and means for restricting the passage of the gas from one end of said vessel to the other through the connecting means whereby a damping action is produced on said rolling member by its piston action in forcing the gas out of one end of said vessel and into the other through said restricted passage.

15. An inclinometer comprising means providing an elongated glass-walled chamber containing a gas, and a rolling member in said chamber adapted to roll therein by the action of gravity upon inclination of said chamber lengthwise, said chamber having an internal surface such that said rolling member forms a piston fit therein whereby the gas is substantially prevented from passing around said rolling member, and also having a restricted passage at least at one end thereof whereby a damping action is produced on said rolling member by its piston action in forcing the gas out of said chamber through said restricted passage.

16. An inclinometer comprising means providing an elongated glass-walled curved chamber containing a gas, means forming a connection between the ends of said chamber to provide for the passage of said gas from one end of said chamber to the other, a rolling member in said chamber adapted to roll therein by the action of gravity upon inclination of said chamber lengthwise, said chamber having an internal surface such that said rolling member forms a piston fit therein whereby the gas is substantially prevented from passing around said rolling member, and means for restricting the passage of the gas from one end of said chamber to the other through the connection between said ends whereby a damping action is produced on said rolling member by its piston action in forcing the gas out of one end of said chamber and into the other through said restricted passage.

17. An inclinometer comprising means providing an elongated glass-walled curved chamber containing a gas, means forming a connection between the ends of said chamber to provide for the passage of said gas from one end of said chamber to the other, a rolling member in said chamber adapted to roll therein by the action of gravity upon inclination of said chamber lengthwise, said chamber having an internal surface such that said rolling member forms a piston fit therein whereby the gas is substantially prevented from passing around said rolling member, and means for restricting the passage of the gas from one end of said chamber to the other through the connection between said ends whereby a damping action is produced on said rolling member by its piston action in forcing the gas out of one end of said chamber and into the other through said restricted passage, said last-named means being adjustable to vary the damping action on said rolling member as desired.

18. An inclinometer comprising means providing an elongated curved chamber containing a gas and having a transparent wall, a rolling member in said chamber visible through said transparent wall and adapted to roll therein by the action of gravity upon inclination of said chamber lengthwise, said chamber having an internal surface such that said rolling member forms a piston fit therein whereby the gas is substantially prevented from passing around said rolling member, and means providing a restricted connecting passage between the ends of said chamber whereby a damping action is produced on said rolling member by its piston action in forcing the gas out of one end of said chamber and into the other through said restricted passage.

19. An inclinometer comprising means providing an elongated chamber containing a gas and having a transparent wall, a rolling member in said chamber adapted to roll therein by the action of gravity upon inclination of said chamber lengthwise, said chamber having an internal surface such that said rolling member forms a piston fit therein whereby the gas is substantially prevented from passing around said rolling member, and means whereby a damping action is produced on said rolling member by its piston action.

20. An inclinometer comprising means providing an elongated chamber containing a gas and having a transparent wall, a rolling member in said chamber adapted to roll therein by the action of gravity upon inclination of said chamber lengthwise, said chamber having an internal surface such that said rolling member forms a piston fit therein whereby the gas is substantially prevented from passing around said rolling member, and means providing a restricted opening whereby a damping action is produced on said rolling member by its piston action in forcing the gas out of said chamber through said restricted opening.

21. An inclinometer comprising means providing an elongated chamber containing a gas and having a transparent wall, a rolling member in said chamber adapted to roll therein by the action of gravity upon inclination of said chamber lengthwise, said chamber having an internal surface such that said rolling member forms a piston fit therein whereby the gas is substantially prevented from passing around said rolling member, means providing a restricted opening whereby a damping action is produced on said rolling member by its piston action in forcing the gas out of said chamber through said restricted opening, and means for adjusting said opening to vary the damping action.

22. An inclinometer comprising means providing an elongated arcuate chamber containing a gas and having a transparent wall, a rolling member in said chamber adapted to roll therein by the action of gravity upon inclination of said chamber lengthwise, said chamber having an internal surface such that said rolling member forms a close fit therein sufficient to produce a damping action on said rolling member by the gas in the chamber as said member forces the gas from one end of said chamber to the other end thereof.

VICTOR E. CARBONARA.